United States Patent
Wei et al.

(10) Patent No.: US 11,813,707 B2
(45) Date of Patent: Nov. 14, 2023

(54) METALLURGICAL TECHNOLOGY PROBE INSERTION CALIBRATION METHOD EMPLOYING VISUAL MEASUREMENT AND INSERTION SYSTEM THEREOF

(71) Applicant: BAOSHAN IRON & STEEL CO., LTD., Shanghai (CN)

(72) Inventors: Zhenhong Wei, Shanghai (CN); Ruimin Wu, Shanghai (CN); Xitao Song, Shanghai (CN); Changhong Ye, Shanghai (CN); Junjiang Liu, Shanghai (CN); Guodong Xu, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 333 days.

(21) Appl. No.: 17/270,979

(22) PCT Filed: Sep. 12, 2019

(86) PCT No.: PCT/CN2019/105571
§ 371 (c)(1),
(2) Date: Feb. 24, 2021

(87) PCT Pub. No.: WO2020/052624
PCT Pub. Date: Mar. 19, 2020

(65) Prior Publication Data
US 2021/0323104 A1 Oct. 21, 2021

(30) Foreign Application Priority Data
Sep. 13, 2018 (CN) .......................... 201811067742.0

(51) Int. Cl.
*B23P 19/02* (2006.01)
*B25J 9/16* (2006.01)

(52) U.S. Cl.
CPC .......... *B23P 19/022* (2013.01); *B25J 9/1697* (2013.01)

(58) Field of Classification Search
CPC .......... B23P 19/02; B23P 19/10; B23P 19/12; B23P 19/00; B25J 9/1687; B25J 9/1697;
(Continued)

(56) References Cited

U.S. PATENT DOCUMENTS 6,163,946 A   12/2000 Pryor
9,366,553 B2 *  6/2016 Ebner .................... G01N 1/125
(Continued)

FOREIGN PATENT DOCUMENTS

CN   103348228 A  * 10/2013   ............. G01D 11/30
CN   103348228 A    10/2013
(Continued)

OTHER PUBLICATIONS

International Search Report dated Dec. 11, 2019 for PCT Patent Application No. PCT/CN2019/105571.
(Continued)

*Primary Examiner* — Bayan Salone
(74) *Attorney, Agent, or Firm* — Lei Fang, Esq.; Smith Tempel Blaha LLC

(57) ABSTRACT

A metallurgical technology probe insertion calibration method employing visual measurement and an insertion system thereof are provided. A vision sensor (5), a cylindrical rod (1), and a metallurgical technology probe (2) are used to construct an agreed region (6). In the agreed region (6), the vision sensor (5) acquires relative positions and orientations of the cylindrical rod (1) and the metallurgical technology probe (2), and an acquired position and orientation result is used to control a driving device (3) to insert the cylindrical rod (1) into the metallurgical technology probe (2). To improve the accuracy and reliability of the
(Continued)

insertion, a standard probe (7) and a fixing device (4) are used together to perform effective calibration on an initial position, orientation, and axis in the insertion.

7 Claims, 10 Drawing Sheets

(58) Field of Classification Search
CPC ......... B25J 9/1692; G05B 2219/40032; G05B 2219/39032; G05B 2219/39024; G01B 21/00; G01B 11/24; G01B 11/272; G01K 13/125

See application file for complete search history.

(56) References Cited

U.S. PATENT DOCUMENTS

| | | | | |
|---|---|---|---|---|
| 11,633,861 | B2 * | 4/2023 | Declerck | B25J 15/0047 |
| | | | | 700/259 |
| 2013/0312548 | A1 * | 11/2013 | Ebner | G01K 13/125 |
| | | | | 73/866.5 |
| 2016/0052135 | A1 * | 2/2016 | Motoyoshi | B25J 9/1633 |
| | | | | 29/281.6 |
| 2016/0075030 | A1 * | 3/2016 | Takahashi | B25J 9/1694 |
| | | | | 901/9 |
| 2018/0093379 | A1 * | 4/2018 | Shimodaira | B25J 15/0206 |

FOREIGN PATENT DOCUMENTS

| | | | | |
|---|---|---|---|---|
| CN | 203785798 U | * | 8/2014 | ............ G01B 21/16 |
| CN | 203785798 U | | 8/2014 | |
| CN | 104057290 A | | 9/2014 | |
| CN | 106041927 A | | 10/2016 | |
| CN | 106242426 A | * | 12/2016 | |
| CN | 106242426 A | | 12/2016 | |
| CN | 106272416 A | * | 1/2017 | ............ B25J 9/1633 |
| CN | 106272416 A | | 1/2017 | |
| CN | 106624709 A | * | 5/2017 | |
| CN | 106624709 A | | 5/2017 | |

OTHER PUBLICATIONS

Written Opinion dated Dec. 11, 2019 for PCT Patent Application No. PCT/CN2019/105571.

Rajive Joshi and Arthur C. Sanderson, Application of Feature-Based Multi-View Servoing for Lamp Filament Alignment, Proceeding of the 1996 IEEE, International Conference Robotics and Automation, Apr. 1996, pp. 1306-1313; figures 1, 2.

Extended EP search report for EP App No. 19859501.9 (B183K62), dated Oct. 13, 2021.

* cited by examiner

METALLURGICAL TECHNOLOGY PROBE INSERTION CALIBRATION METHOD EMPLOYING VISUAL MEASUREMENT AND INSERTION SYSTEM THEREOF

CROSS-REFERENCE TO RELATED APPLICATIONS

This application is a 371 U.S. National Phase of PCT International Application No. PCT/CN2019/105571 filed on Sep. 12, 2019, which claims benefit and priority to Chinese patent application no. CN 201811067742.0 filed on Sep. 13, 2018, the contents of both are incorporated by reference herein in their entiries.

TECHNICAL FIELD

The present invention relates to and is oriented to a metallurgical technology probe, and more specifically, to a metallurgical technology probe insertion calibration method employing visual measurement and an insertion system thereof.

BACKGROUND ART

As an example, in reference document 1, Chinese patent publication No. CN 103348228 A discloses a method for inserting a long-axis contact rod into a probe with an open end face by means of a mechanical centering device and a holding frame containing multiple sets of centering devices. However, the main disadvantages thereof are as follows:
1) In this method, for the contact rod, the centering device only has a point positioning function but lacks an axial positioning function. This makes it impossible for the centering device to guarantee the insertion direction of the contact rod is consistent with a longitudinal axis of the probe when the pose of the contact rod is not appropriate, there is an angle difference and the possibility of failure of the contact rod insertion is increased as a result. If the axial positioning of the contact rod is added by means of a mechanical mechanism, when a robot is used for carrying out inserting and the insertion pose is deviated, the mechanical structures such as a tool and a positioning device are each subjected to a strong action force and reaction force, and therefore it is not conducive to smooth insertion.
2) In this method, there is a lack of a good calibration of the initial pose of the contact rod during insertion operation, but the actual situation is that if the initial pose of the contact rod is not properly calibrated, it will be combined with disadvantage 1) described above, thereby increasing the failure rate of the insertion, and reducing the quality of the insertion process.
3) It is also mentioned that this method is applicable when the contact rod is not bent, and it is impossible to perform prediction and checking when the contact rod is bent, and the bending of the contact rod will inevitably lead to the failure of its insertion.

Therefore, the centering device of reference document 1 described above has a point positioning function but lacks an axial positioning function; in addition, there is a lack of a good calibration of the initial pose of the contact rod in this method, so it is difficult to ensure that the angular deviation between axes of the long-axis contact rod and the probe is relatively small, which reduces the quality of the entire insertion process.

As another example, in reference document 2, Chinese patent publication No. CN 106242426 A discloses a method for assembling an elongated shaft using force sense and visual sense. This method uses visual hole searching to adjust the pose of a robot by comparing a collected image with the pose of a probe stored in a host computer, but the main disadvantages thereof are as follows:
1) In this method, there is a lack of calibration of the deformation of the elongated shaft itself, and if it is desired to adjust through the force feedback during the insertion process, the control is complicated in this method, and it is also impossible to perform prediction and make compensation by means of the pose of the elongated shaft when the deformation is too large, which leads to the failure of the insertion. Similar to the reference patent CN 103348228 A, the deformation of the elongated shaft itself will greatly affect the insertion process, which reduces the reliability of the method.
2) This method introduces the process of hole searching, and an executing mechanism is adjusted in this process by comparing the position and orientation of a hole-based workpiece stored in the host computer. Due to the inevitable deviation between the stored position and orientation and the current position and orientation of the hole-based workpiece, such as the machining inconsistency of the hole-based workpiece, the deviation is also introduced and cannot be compensated by algorithms in this method.
3) This method is based on vision and force sensors, and the lack of calibration of a cylindrical rod and a hole-based workpiece will inevitably lead to complex algorithms, so that it is difficult to ensure the success rate and the speed of the insertion operation.

Therefore, in reference document 2 described above, there is definitely a deviation between the actual pose of the probe and the stored pose of the probe, which results in a deviation in the hole-searching stage. In addition, the lack of calibration of the deformation of the elongated shaft itself will also reduce the reliability of the method.

SUMMARY OF THE INVENTION

In view of the above defects in the prior art, an objective of the present invention is to provide a metallurgical technology probe insertion calibration method employing visual measurement and an insertion system thereof, which analyze the relative position and orientation of the cylindrical rod and the probe employing vision, and use a vision sensor to calibrate the cylindrical rod, thereby accurately completing the insertion of the probe.

In order to achieve the above objective, the following technical solutions are used in the present invention:

In one aspect, a metallurgical technology probe insertion calibration method employing visual measurement comprises the following steps:
a) a driving device driving a cylindrical rod to move to a standard insertion position, and adjusting the cylindrical rod to a pre-calibrated and pre-collected standard orientation;
b) the driving device then driving the cylindrical rod to initially move towards a metallurgical technology probe in a direction of a pre-calibrated standard axis with the standard orientation being maintained;
c) a vision sensor collecting physical contours of the cylindrical rod and the metallurgical technology probe in an agreed area in real time, measuring a spatial relative position between a front end face of the cylindrical rod and an open end face of the metallurgical technology probe, and also measuring a relative spatial angle between an axis of the cylindrical rod and an axis of the metallurgical technology probe, and calculating an adjustment amount by means of an algorithm;

d) regulating, according to the adjustment amount obtained in step c), the movement of the driving device during the movement of the cylindrical rod to the metallurgical technology probe, so as to ensure that the axis of the cylindrical rod is consistent with the axis of the metallurgical technology probe, so that the front of the cylindrical rod is inserted into the metallurgical technology probe; and e) the vision sensor continuing to measure the relative spatial angle between the axis of the cylindrical rod and the axis of the metallurgical technology probe, and at the same time, obtaining an adjustment amount according to the deformation of the cylindrical rod itself and by means of an algorithm, and the driving device continuing to move the cylindrical rod according to the adjustment amount to ensure that the insertion length of the cylindrical rod meets a standard requirement.

In step a), the pre-calibration and pre-collection are specified as follows:

1) the cylindrical rod uses the standard axis as the rotation axis and rotates at a fixed angular interval; and
2) the vision sensor collects the contour of a front end of the cylindrical rod every time the cylindrical rod is rotated by an angle, and deviation values of the contour of the front end of the cylindrical rod at different rotation angles are compared to obtain deformation parameters of the cylindrical rod.

the standard orientation, the standard axis and the standard position are all determined by using a standard probe as follows:

the driving device is used to move the cylindrical rod to abut against a deep-hole cross-section of the standard probe to obtain the standard orientation;

the driving device is used to move the cylindrical rod to abut against the deep-hole cross-section of the standard probe, the cylindrical rod is moved repeatedly, and no less than three points are taken to obtain the standard axis; and the standard position is in the standard axis and within the agreed area.

the standard probe is made of an iron material, and is manufactured by imitating the metallurgical technology probe by means of machining.

In another aspect, a metallurgical technology probe insertion system employing visual measurement comprises: a cylindrical rod and a metallurgical technology probe, a front end of the metallurgical technology probe being an open end along which a deep hole is provided such that the metallurgical technology probe is configured to be hollow for allowing a front end of the cylindrical rod to be inserted into the deep hole of the metallurgical technology probe along the open end, and further comprises: a driving device, a fixing device and a vision sensor, wherein the driving device is configured to be connected to and fix a rear end of the cylindrical rod, and to move the position of the cylindrical rod;

the fixing device is configured to fix the metallurgical technology probe such that the open end of the metallurgical technology probe is aligned with the front end of the cylindrical rod;

the insertion length of the front end of the cylindrical rod and the insertion length of the open end of the metallurgical technology probe form an agreed area;

there are two vision sensors, one of which is located vertically above the agreed area by means of a fixed bracket and the other is located on a horizontal side of the agreed area by means of a fixed bracket, which respectively detect and collect physical contours of the cylindrical rod and the metallurgical technology probe in the agreed area in real time; and a controller acquires related data measured by the vision sensors, calculates a point angular deviation between an axis of the cylindrical rod and an axis of the metallurgical technology probe, and a distance between an end cross-section of the cylindrical rod and an open end cross-section of the metallurgical technology probe, then obtains a pose offset, namely an adjustment amount, of the cylindrical rod, and then controls the driving device to adjust the pose of the cylindrical rod according to the adjustment amount.

the driving device is a multi-axis manipulator.

the vision sensor is an industrial camera.

the metallurgical technology probe insertion system further comprises a standard probe, which is manufactured by imitating the metallurgical technology probe and reproduces the deep hole of the metallurgical technology probe, and in order to facilitate the abutment of the cylindrical rod during calibration, a part of the deep hole is removed and therefore exposed to form a deep-hole cross-section.

the cylindrical standard probe is connected to a fixing block, and a support corresponding to the fixing block is also provided with a groove; when the standard probe is placed on the support, the deep-hole cross-section is vertically upward, and the fixing block is embedded in the groove and mated with the groove with a non-circular profile connection, so that the axis of the probe cannot move and rotate.

In the above technical solutions, the present invention provides a metallurgical technology probe insertion calibration method employing visual measurement and an insertion system thereof, which use a non-contact visual insertion means and use visual recognition to guide the driving device to adjust the pose of the cylindrical rod, thereby solving the problem of axis positioning. In addition, a standard probe is introduced. The standard probe is based on the metallurgical technology probe, and the standard probe and an insertion mating face of the cylindrical rod are exposed to the outside. The insertion mating face has a certain length, so that the initial pose of the cylindrical rod can be calibrated intuitively and reliably. By introducing a method in which the vision sensor predicts and checks the state of the cylindrical rod, the technical means that are missing in the reference document 1 are made up. The present invention also specifies the recognition range of the vision sensor. In this range, the vision sensor is used to directly measure the current relative position and orientation of the metallurgical technology probe and the cylindrical rod, omitting the stored value mentioned in the reference document 2, thereby making the relative deviation of the obtained pose more accurate and direct. Regarding calibration, the present invention is more perfect and effective.

DETAILED DESCRIPTION OF EMBODIMENTS

Figure 1:
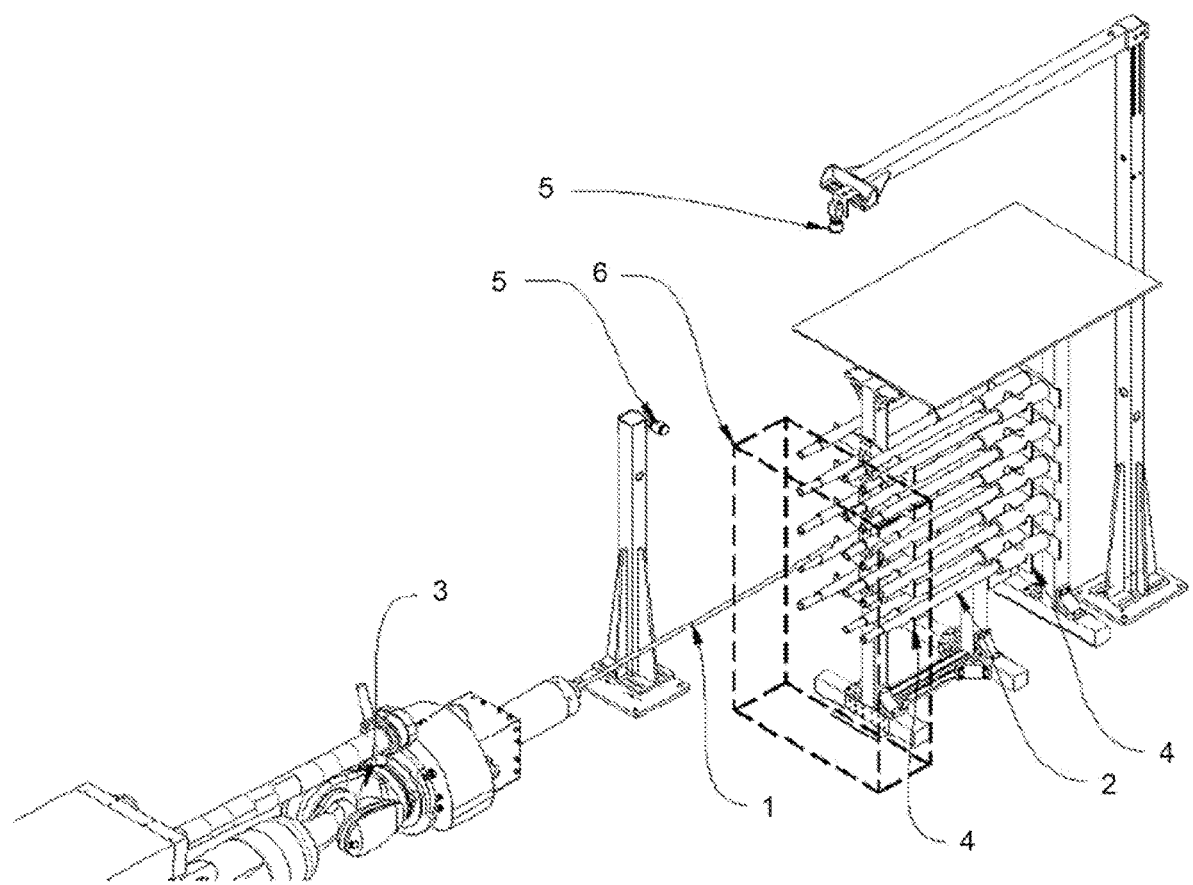
FIG. 1 is a schematic structural diagram of an insertion system of the present invention.
Figure 2:
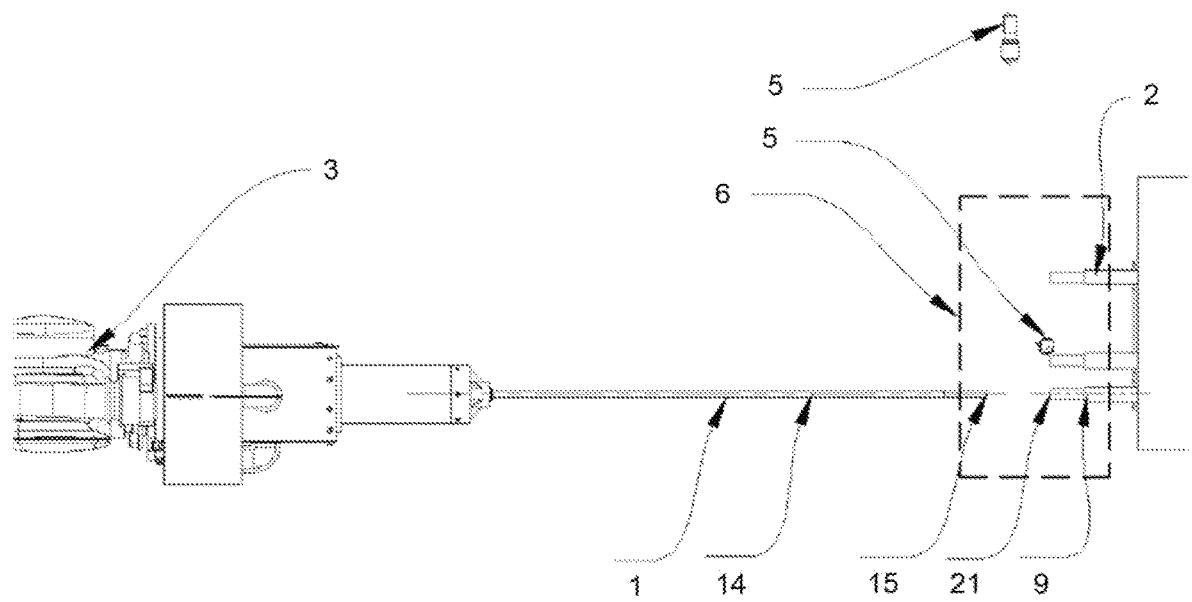
FIG. 2 is a side view of the insertion system of the present invention of FIG. 1.
Figure 3A:
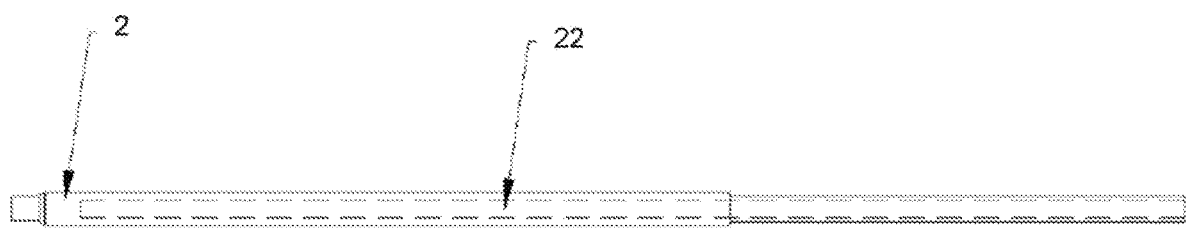
FIG. 3A is a side view of a metallurgical technology probe in the insertion system of the present invention.
Figure 3B:
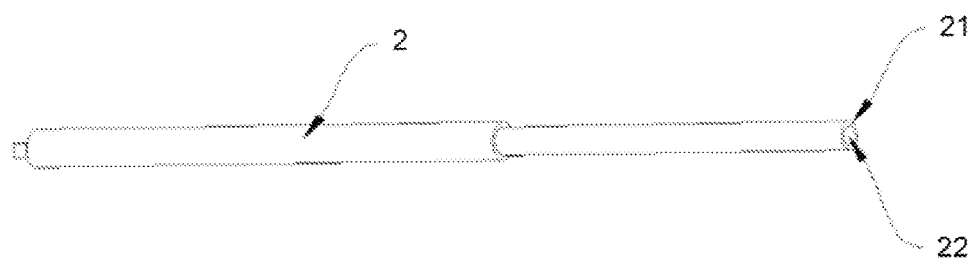
FIG. 3B is an axonometric view of the metallurgical technology probe in the insertion system of the present invention.

The technical solutions of the invention are further described below with reference to the accompanying drawings and embodiments.

As shown in FIGS. 1 to 3B, a metallurgical technology probe insertion system employing visual measurement provided in the present invention comprises: a cylindrical rod 1 and a metallurgical technology probe 2. A front end of the metallurgical technology probe 2 is an open end 21, and a deep hole 22 is provided along the open end 21 such that the metallurgical technology probe 2 is configured to be hollow for allowing a front end of the cylindrical rod 1 to be inserted into the deep hole 22 of the metallurgical technology probe 2 along the open end 21. The above is belongs to the prior art and will not be described in detail herein. Different from the prior art, the system further comprises: a driving device 3, a fixing device 4 and a vision sensor 5, wherein the driving device 3 and the vision sensor 5 are also connected to a computer (an implementation of a controller), and the computer acquires related data measured by the driving device 3 and the vision sensor 5, and thus controls the movement of the driving device 3 through a calculation method.

Preferably, the driving device 3 is configured to be connected to and fix a rear end of the cylindrical rod 1, and to move the position of the cylindrical rod 1, and the driving device 3 takes the form of a multi-axis manipulator.

Preferably, the fixing device 4 is configured to fix the metallurgical technology probe 2 such that the open end 21 of the metallurgical technology probe 2 can be aligned with the front end of the cylindrical rod 1.

Preferably, the insertion length of the front end of the cylindrical rod 1 and the insertion length of the open end 21 of the metallurgical technology probe 2 form an agreed area 6, and the agreed area 6 includes the front end of the cylindrical rod 1 and the open end 21 of the metallurgical technology probe 2, and also includes a length, not shorter than the insertion length, of the cylindrical rod 1 and the metallurgical technology probe 2. The detection cost is reduced and the detection accuracy is improved. Regarding the agreed area 6, there is a small fit clearance and a high tightness of fit between the cylindrical rod 1 and the metallurgical technology probe 2 in practical applications, and thus the insertion length of the two requiring accurate detection is much smaller than the deep hole 22 of the metallurgical technology probe 2. For example, the metallurgical technology probe 2 has an inner diameter of 18 mm, and the cylindrical rod 1 has an outer diameter of 16 mm.

Preferably, there are two vision sensors 5, both are industrial cameras, one of which is located vertically above the agreed area 6 by means of a fixed bracket and can clearly view, from the top, the relative position and angle between the cylindrical rod 1 and the metallurgical technology probe 2 in the agreed area 6, and the other is located on a horizontal side of the agreed area 6 by means of a fixed bracket and can clearly view, from the side, the relative position and angle between the cylindrical rod 1 and the metallurgical technology probe 2 in the agreed area 6. Through the image comparison and data analysis for the two cameras, the spatial positions and orientations of the cylindrical rod 1 and the metallurgical technology probe 2 are reproduced.

It is conceivable that when there are multiple sets of metallurgical technology probes 2 and corresponding fixing devices 4, it is impossible to ensure that the vision sensor 5 is directly above each metallurgical technology probe 2, but there is a certain angle. However, the arrangement of the two vision sensors 5 can ensure that even if there is an angle, the two vision sensors 5 can obtain the spatial angle and position deviations between the cylindrical rod 1 and the metallurgical technology probe 2 through an image comparison algorithm.

Figure 4A:
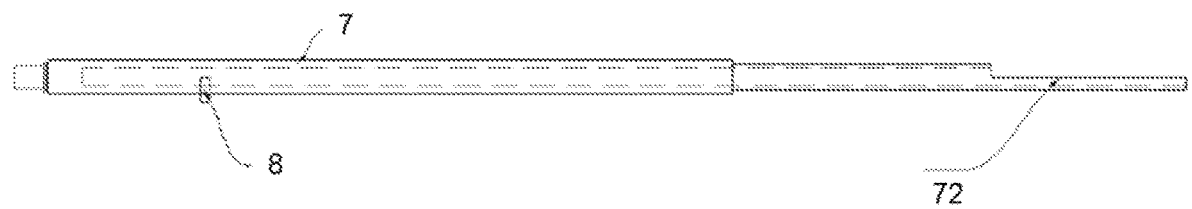
FIG. 4A is a side view of a standard probe in the insertion system of the present invention.
Figure 4B:
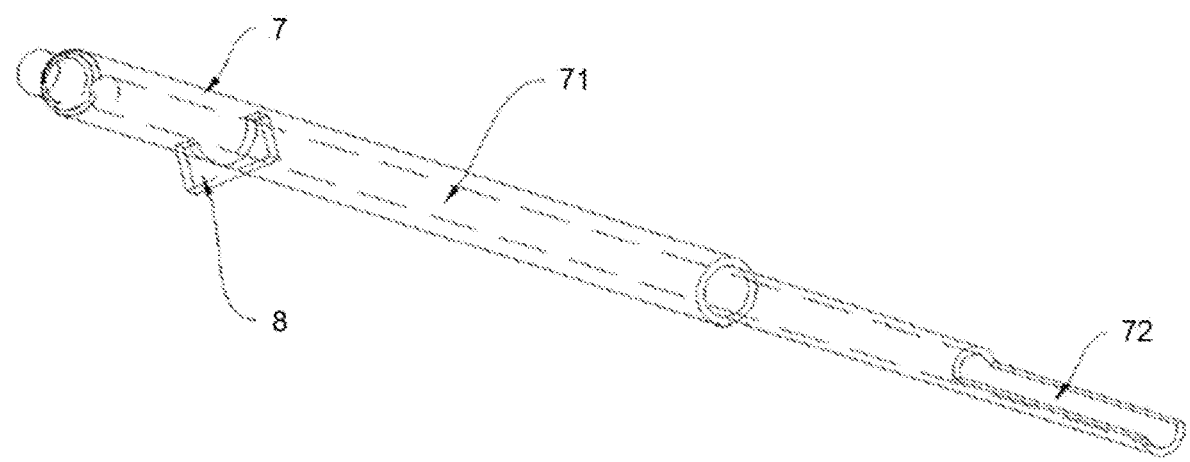
FIG. 4B is an axonometric view of the standard probe in the insertion system of the present invention.

As shown in FIGS. 4A and 4B, a standard probe 7 is further comprised. The standard probe 7 is made of an iron material and is manufactured by imitating the metallurgical technology probe 2 by means of machining. The standard probe 7 reproduces the deep hole 71 of the metallurgical technology probe 2. Moreover, in order to facilitate the abutment of the cylindrical rod 1 during calibration, a part of the deep hole 71 is removed and therefore exposed to form a deep-hole cross-section 72. In addition, in order to ensure that the cylindrical standard probe 7 will not rotate and translate during calibration, the standard probe 7 is fixed by using a fixing block 8. When the standard probe 7 is placed on a supporting point 42, the deep-hole cross-section 72 is vertically upward, and an axis 9 of the probe cannot move or rotate.

Figure 5A:
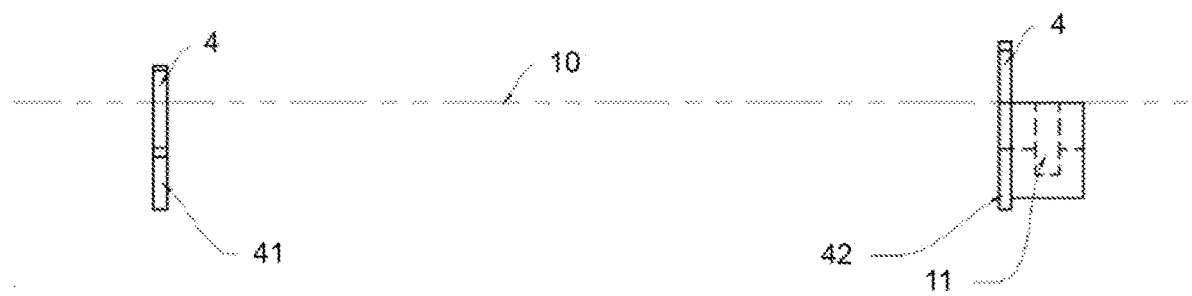
FIG. 5A is a side view of a fixing device in the insertion system of the present invention.
Figure 5B:
FIG. 5B is an axonometric view of the fixing device in the insertion system of the present invention.

As shown in FIGS. 5A and 5B, the fixing device 4 comprises at least two supports 41, 42 for supporting the metallurgical technology probe 2. Supporting parts of the supports 41, 42 are both V-shaped, and can ensure that when the metallurgical technology probe 2 is placed, the axis 9 of the probe coincides with a horizontal axis 10. The support 42 is different from the support 41 in that the support 42 is further provided with a groove 11. The fixing block 8 is embedded into the groove 11, and the groove is therefore connected to the fixing block 8 and mated with the fixing block 8 with a profile connection, such that the axis 9 of the probe cannot move and rotate.

The present invention further provides a metallurgical technology probe insertion calibration method employing visual measurement, comprising the following steps:

a) a driving device 3 driving a cylindrical rod 1 to move to an insertion standard position 11, and adjusting the cylindrical rod 1 to a pre-calibrated and pre-collected standard orientation 12;

b) the driving device 3 then driving the cylindrical rod 1 to initially move towards a metallurgical technology probe 2 in a direction of a pre-calibrated standard axis 13 with the standard orientation 12 being maintained;

c) a vision sensor 5, which is located at the top of an agreed area 6, detecting and collecting physical contours of the cylindrical rod 1 and the metallurgical technology probe 2 in the agreed area 6 in real time, so as to obtain a point angular deviation of an axis 14 of the cylindrical rod and an axis of the probe 9, and also detecting a distance between an end cross-section 15 of the cylindrical rod and a cross-section of an open end 21 of the metallurgical technology probe 2; a vision sensor 5, which is located on aside of the agreed area 6, detecting the point angular deviation of the axis 14 of the cylindrical rod and the axis of the probe 9 in real time, and also detecting the distance between the end cross-section 15 of the cylindrical rod and the cross-section of the open end 21 of the metallurgical technology probe 2; and obtaining a pose offset, namely an adjustment amount ($\Delta x$, $\Delta y$, $\Delta z$, $\Delta \theta x$, $\Delta 5 \theta y$, $\Delta \theta z$), of the cylindrical rod 1 according to the results of the two vision sensors 5 and by means of a certain calculation;

d) regulating, according to the adjustment amount ($\Delta x$, $\Delta y$, $\Delta z$, $\Delta \theta x$, $\Delta \theta y$, $\Delta \theta z$) obtained in step c), the movement of the driving device 3 during the movement of the cylindrical rod 1 to the metallurgical technology probe 2, so as to ensure that the axis 14 of the cylindrical rod is consistent with the axis 9 of the probe, so that the front of the cylindrical rod 1 is inserted into the metallurgical technology probe 2; and e) the vision sensors 5 continuing to measure a relative spatial angle ($\Delta \theta x$, $\Delta \theta y$, $\Delta \theta z$) between the axis 15 of the cylindrical rod and the axis 9 of the probe, and at the same time, obtaining an adjustment amount ($\Delta x$, $\Delta y$, $\Delta z$, $\Delta \theta x$, $\Delta \theta y$, $\Delta \theta z$) according to the deformation ($\Delta z$, $\beta$, $\Delta d$) of the cylindrical rod 1 itself and by means of a certain calculation, and the driving device 3 continuing to move the cylindrical rod 1 according to the adjustment amount to ensure that the insertion length of the cylindrical rod 1 meets a standard requirement.

Since the insertion process is actually to determine the actual relative pose deviation of the cylindrical rod 1 and the metallurgical technology probe 2, the high-precision visual detection is directly focused on the acquisition of the relative pose deviation through the insertion calibration method of the present invention, eliminating the need for intermediate conversion and the deviation caused by theoretical data.

During the movement of the cylindrical rod 1 towards the metallurgical technology probe 2 in step a), the calculation of the adjustment amount by the vision sensor 5 in step c) is performed in real time.

Figure 6:
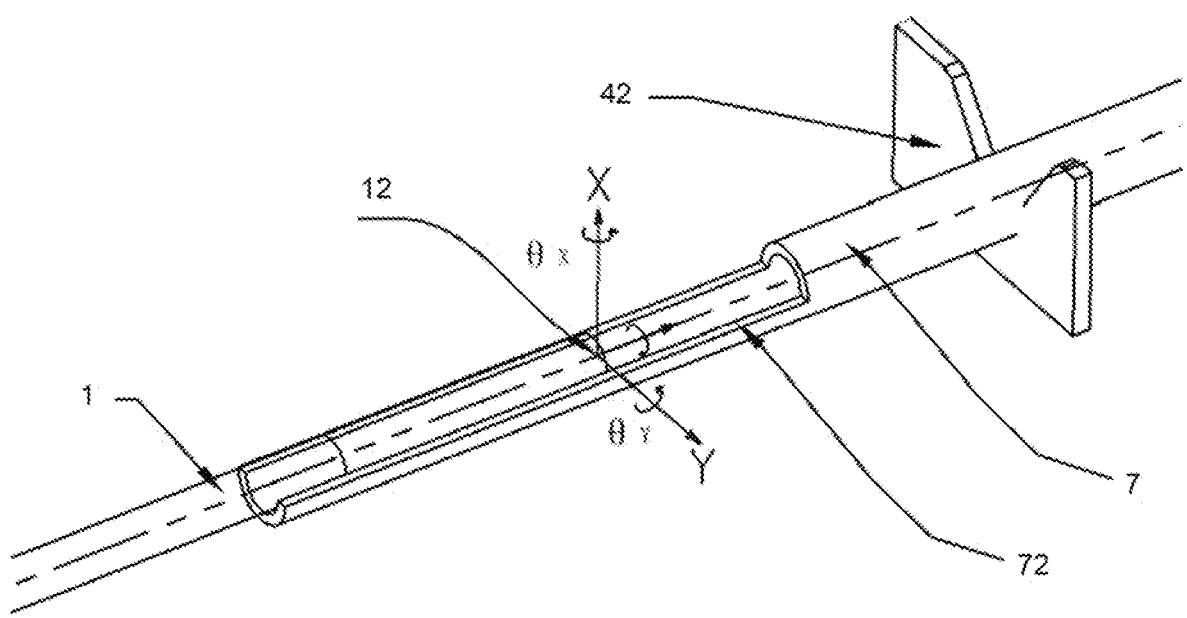
FIG. 6 is a schematic diagram of a standard orientation in an insertion calibration method of the present invention.

As shown in FIG. 6, the driving device 3 is used to move the cylindrical rod 1 to abut against a deep-hole cross-section 72 of a standard probe 7, and an orientation ($\theta x$, $\theta y$, $\theta z$) of the cylindrical rod 1 displayed in the driving device 3 is recorded, wherein the pose is the standard orientation 12.

Figure 7:
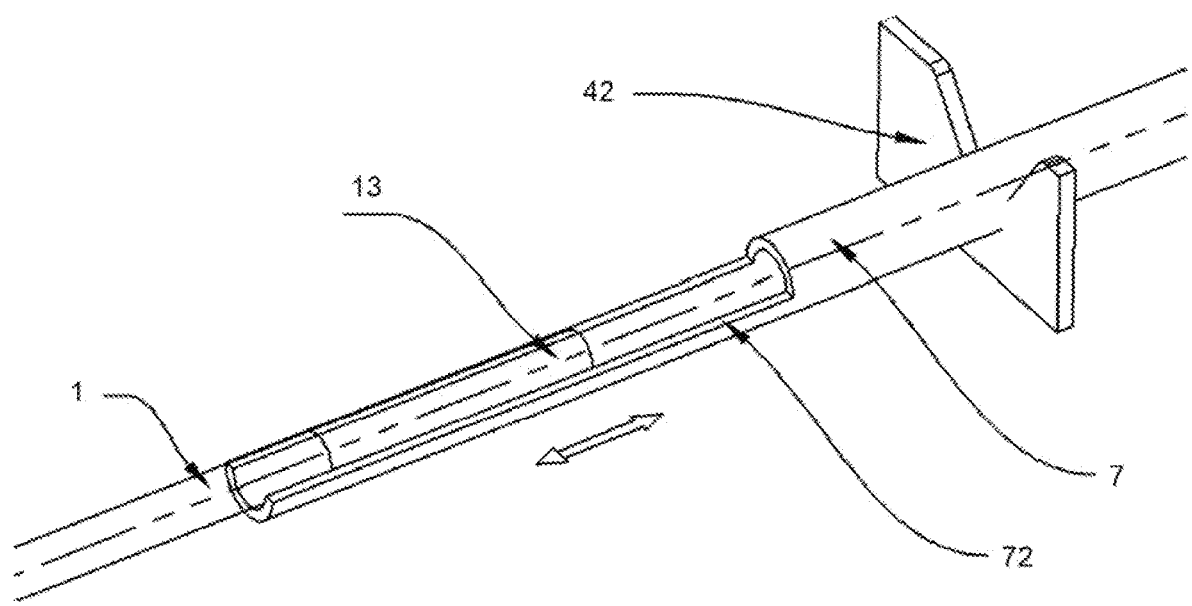
FIG. 7 is a schematic diagram of a method for obtaining a standard axis in the insertion calibration method of the present invention.

As shown in FIG. 7, the driving device 3 is used to move the cylindrical rod 1 to abut against the deep-hole cross-section 72 of the standard probe 7, the cylindrical rod is moved repeatedly, no less than three points are taken, ensuring that each point abuts against the deep-hole cross-section 72 of the standard probe 7, the acquired points are used to obtain the standard axis 13 and the standard axis is recorded in the driving device 3.

Figure 8:
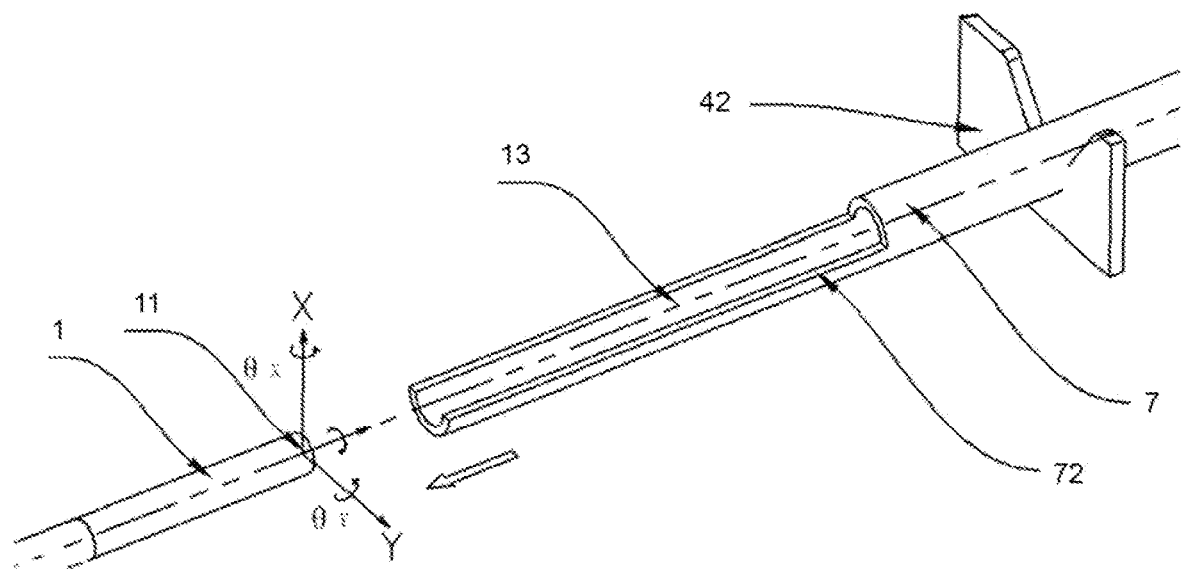
FIG. 8 is a schematic diagram of a method for obtaining a standard position in the insertion calibration method of the present invention.

As shown in FIG. 8, the driving device 3 is used to move the cylindrical rod 1 to abut against a deep-hole cross-section 72 of a standard probe 7, the cylindrical rod moves away from the deep-hole cross-section 72 area along the standard axis 13 by a certain distance, and a position (x, y, z), namely the standard position 11, of the cylindrical rod displayed in the driving device 3 is recorded.

Figure 9:
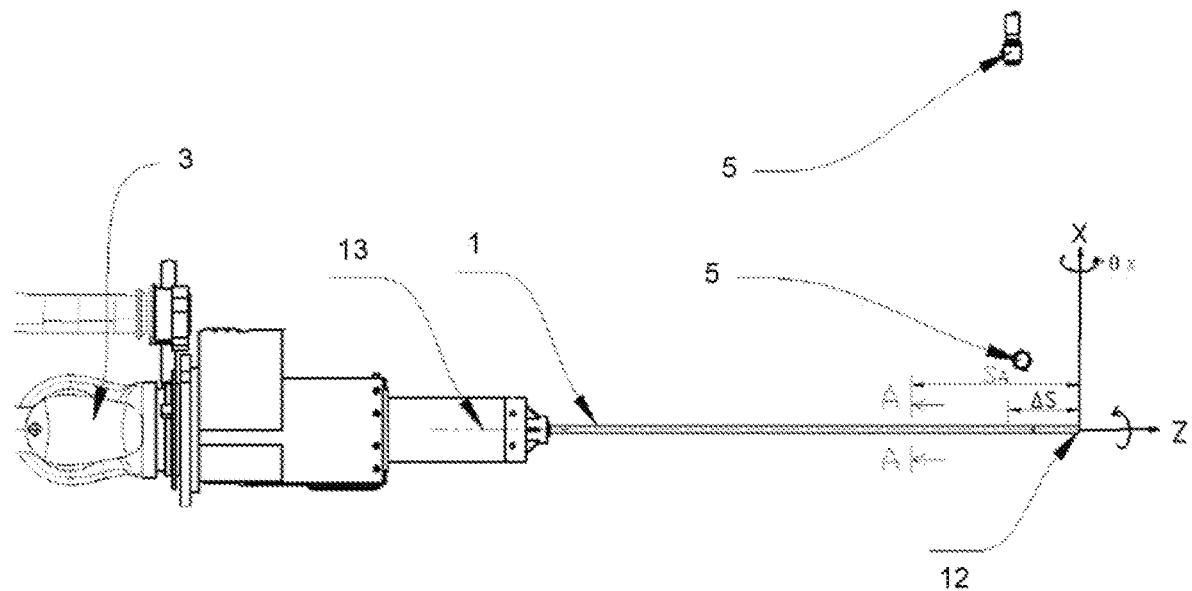
FIG. 9 is a side view of the calibration of a cylindrical rod in the insertion calibration method of the present invention.
Figure 10:
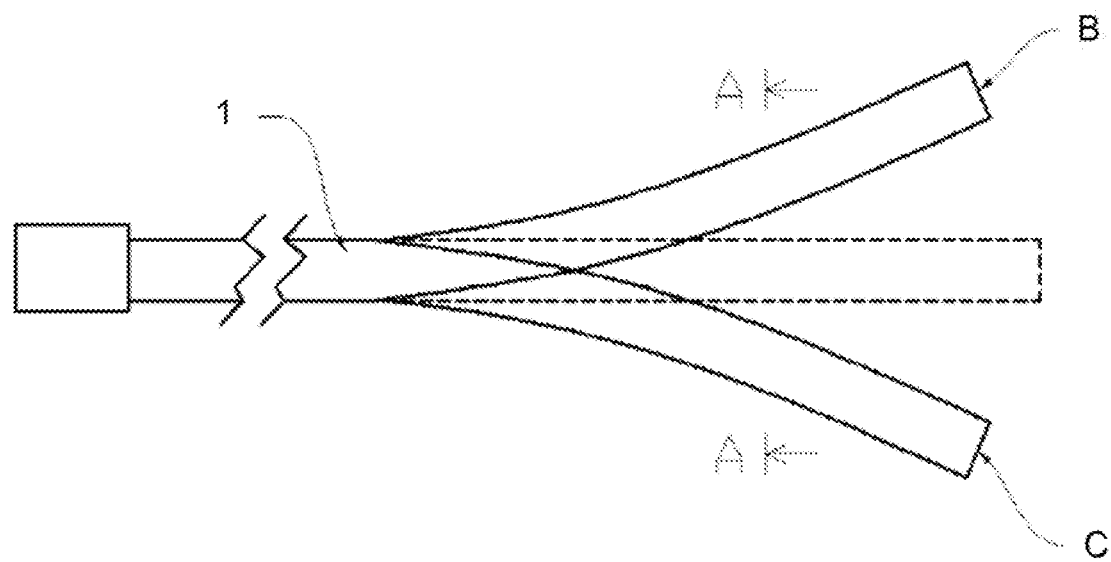
FIG. 10 is a schematic diagram of a method for calibrating a cylindrical rod in the insertion calibration method of the present invention.
Figure 11:
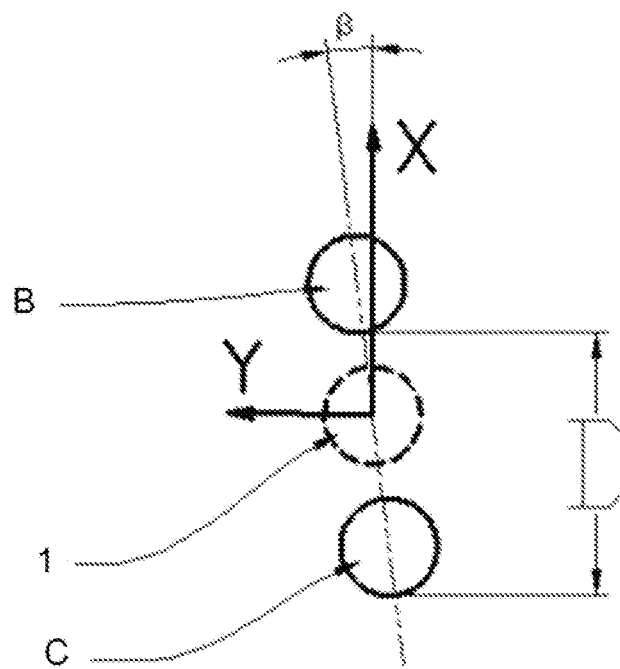
FIG. 11 is a schematic diagram of the method for calibrating a cylindrical rod in FIG. 10 in the A-A direction.

FIGS. 9 to 11 illustrate the process of calibrating the deformation of the cylindrical rod 1 itself by using the vision sensors 5.

1) The driving device 3 drives the cylindrical rod 1 to move to the insertion standard position 11, and adjusts the cylindrical rod 1 to a pre-calibrated and pre-collected standard orientation 12.

2) FIG. 9 shows the state of the cylindrical rod 1 in the standard position 11. The cylindrical rod 1 uses the standard axis 13 as the rotation axis, and rotates at a fixed angular interval a according to the rotation direction of the z-axis to obtain different states (as labeled B and C in FIG. 10) of the cylindrical rod 1. The total number of rotations is $360/\alpha$, and an angle sequence (0, $\alpha$, ..., $360-\alpha$) is obtained. For sake of convenience, $\alpha$ may be taken as a common divisor of 360. For example, if the total number of rotations is 4, rotating 90° each time, the angle sequence is (0°, 90°, 180°, 270°).

3) At each angle in the angle sequence, the vision sensors 5 collect the contour of the front end of the cylindrical rod 1 and the deviation values of the contour when the cross-section is at different angles are compared to obtain a deviation value group ($S_A$, $D_0$, $D_\alpha$, ..., $D_{180/\alpha}$). For example, there is a cross-section A-A at a distance of $S_A$ from the end face 15 of the cylindrical rod, when the rotation angle is 0° and 180°, the contour difference $D_\alpha=D1$, and when the rotation angle is 90° and 270°, the contour difference $D_\alpha=D2$, thereby obtaining a deviation value group ($S_A$, D1, D2).

4) According to the deviation value group ($S_A$, D1, D2), under the premise that the cross-section of the cylindrical rod 1 is circular, the maximum deviation value $\Delta D$ of the contour of the cross-section of the cylindrical rod 1 and the rotation angle $\beta$ at this time are calculated to obtain deformation parameters ($S_A$, $\beta$, $\Delta D$) at the cross-section A-A.

5) Since the cross-section A-A can be defined at different positions, in the present invention, it is set as $S_A = n*\Delta s$ (n=1, 2, ..., n), and the obtained deformation parameters of the front end of the entire cylindrical rod 1 are ($S_A$, $\beta$, $\Delta D$).

The measurement of the deformation of the cylindrical rod is versatile, and is not limited to ensuring that the difficulty and failure rate of the entire insertion process will not increase due to the excessive deviation of the cylindrical rod, and the deformation parameters are also used to adjust the pose of the cylindrical rod to reduce the difficulty of insertion in the insertion stage after the cylindrical rod has been inserted into the metallurgical technology probe. Before the start of the insertion, it is necessary to determine whether the deformation of the cylindrical rod itself is too large, and if it exceeds a rated value, the cylindrical rod needs to be replaced. Upon the start of the insertion, from the initial insertion of the cylindrical rod into the metallurgical technology probe until the insertion is completed, the deformation of the cylindrical rod itself can be used as a reference value for the pose of the cylindrical rod.

The invention claimed is:

1. A metallurgical technology probe insertion system employing visual measurement comprises: a cylindrical rod and a metallurgical technology probe, wherein a front end of the metallurgical technology probe is an open end along which a deep hole is provided, and wherein the metallurgical technology probe is configured to be hollow for allowing a front end of the cylindrical rod to be inserted into the deep hole of the metallurgical technology probe along the open end, and wherein the metallurgical technology probe insertion system further comprises: a driving device, a fixing device, two vision sensors, a controller, and a standard probe, wherein the driving device is configured to be connected to and fix a rear end of the cylindrical rod, and to be capable of moving a position of the cylindrical rod and adjusting a-pose of the cylindrical rod;

the fixing device is configured to fix the metallurgical technology probe, wherein the open end of the metallurgical technology probe is aligned with the front end of the cylindrical rod;

an insertion length of the front end of the cylindrical rod and an insertion length of the open end of the metallurgical technology probe form an agreed area;

the two vision sensors, one is located vertically above the agreed area by a fixed bracket and another one is located on a horizontal side of the agreed area by another fixed bracket, wherein the two vision sensors respectively detect and collect physical contours of the cylindrical rod and the metallurgical technology probe in the agreed area in real time;

the controller acquires related data measured by the vision sensors, calculates a point angular deviation between an axis of the cylindrical rod and an axis of the metallurgical technology probe, and a distance between an end cross-section of the cylindrical rod and an open end cross-section of the metallurgical technology probe, obtains an adjustment amount of the cylindrical rod, and controls the driving device to adjust the pose of the cylindrical rod according to the adjustment amount; and the standard probe manufactured by imitating the metallurgical technology probe reproduces the deep hole of the metallurgical technology probe, and in order to facilitate the abutment of the cylindrical rod during calibration, a part of the deep hole is removed and exposed to form a deep-hole cross-section.

2. The metallurgical technology probe insertion system of claim 1, wherein the driving device is a multi-axis manipulator.

3. The metallurgical technology probe insertion system of claim 1, wherein the vision sensor is an industrial camera.

4. The metallurgical technology probe insertion system of claim 1, wherein the cylindrical standard probe is connected to a fixing block, and a support corresponding to the fixing block is provided with a groove, and wherein, when the standard probe is placed on the support, the deep-hole cross-section is vertically upward, and the fixing block is embedded in the groove and mated with the groove with a non-circular profile connection, and wherein the axis of the probe cannot move and rotate.

5. A metallurgical technology probe insertion calibration method using the metallurgical technology probe insertion system of claim 1, said method comprising the following steps:

a) providing a standard probe manufactured by imitating the metallurgical technology probe, wherein the standard probe reproduces the deep hole of the metallurgical technology probe, and in order to facilitate the abutment of the cylindrical rod during calibration, a part of the deep hole is removed and exposed to form a deep-hole cross-section;

b) determining a standard orientation, a standard axis and a standard position using the standard probe before insertion operation, wherein the driving device is used to move the cylindrical rod repeatedly to abut against the deep-hole cross-section of the standard probe to obtain the standard orientation, and no less than three points which are taken to obtain the standard axis; and wherein the standard position is in the standard axis and within the agreed area; and c) providing a calibration method comprising the following steps:

i) driving the cylindrical rod to move to the standard insertion position and adjusting the cylindrical rod to a pre-calibrated and pre-collected standard orientation;

ii) driving the cylindrical rod to initially move towards the metallurgical technology probe in a direction of a pre-calibrated standard axis with the standard orientation being maintained;

iii) collecting physical contours of the cylindrical rod and the metallurgical technology probe in the agreed area in real time, measuring a spatial relative position between a front end face of the cylindrical rod and an open end face of the metallurgical technology probe, and a relative spatial angle between an axis of the cylindrical rod and an axis of the metallurgical technology probe, and calculating an adjustment amount by an algorithm;

iv) according to the adjustment amount obtained in step iii), regulating the movement of the cylindrical rod to the metallurgical technology probe to ensure that the axis of the cylindrical rod is consistent with the axis of the metallurgical technology probe and the front end face of the cylindrical rod is inserted into the metallurgical technology probe; and v) continuing to measure a relative spatial angle between the axis of the cylindrical rod and the axis of the metallurgical technology probe, while obtaining an adjustment amount according to deformation of the cylindrical rod itself and by an algorithm, and continuing to move the cylindrical rod according to the adjustment amount to ensure that insertion length of the cylindrical rod meets a standard requirement.

6. The metallurgical technology probe insertion calibration method of claim 5, wherein the pre-calibrated and pre-collected standard orientation is adjusted by the following steps:

a) using the standard axis as the rotation axis and rotating at a fixed angular interval by the cylindrical rod; and b) collecting a contour of the front end of the cylindrical rod every time the cylindrical rod is rotated by an angle, and comparing deviation values of the contour of the front end of the cylindrical rod at different rotation angles to obtain deformation parameters of the cylindrical rod.

7. The metallurgical technology probe insertion calibration method of claim 5, wherein the standard probe is made of an iron material, and is manufactured by imitating the metallurgical technology probe by machining.

* * * * *